United States Patent [19]
Szerdahelyi et al.

[11] Patent Number: 5,979,115
[45] Date of Patent: Nov. 9, 1999

[54] TWIN-SHELL VEHICLE DOOR WITH DOUBLE-STRAND CABLE WINDOW LIFT MECHANISM PRE-FITTED ON A SUPPORT PLATE

[75] Inventors: Ferenc Szerdahelyi, Coburg; Eberhard Pleiss, Untersiemau, both of Germany

[73] Assignee: Brose Fahrzeugteile GmbH & Co KG, Coburg, Germany

[21] Appl. No.: 08/930,460

[22] PCT Filed: Mar. 25, 1996

[86] PCT No.: PCT/DE96/00552

§ 371 Date: Sep. 26, 1997

§ 102(e) Date: Sep. 26, 1997

[87] PCT Pub. No.: WO96/30226

PCT Pub. Date: Oct. 3, 1996

[30] Foreign Application Priority Data

Mar. 25, 1995 [DE] Germany .................. 195 11 105

[51] Int. Cl.[6] ........................................ B60J 5/04
[52] U.S. Cl. .................... 49/502; 49/352; 296/146.7
[58] Field of Search .................. 46/502, 352; 296/146.7

[56] References Cited

U.S. PATENT DOCUMENTS

| | | | |
|---|---|---|---|
| 4,848,829 | 7/1989 | Kidd ............................ | 49/502 |
| 5,050,350 | 9/1991 | Bertonlini et al. ............ | 49/502 |
| 5,056,264 | 10/1991 | Jewell, II et al. ............ | 49/502 |
| 5,308,138 | 5/1994 | Hlavaty ........................ | 49/502 |
| 5,379,553 | 1/1995 | Kimura et al. ............... | 49/502 |
| 5,536,060 | 7/1996 | Rashid et al. ................ | 49/502 |

FOREIGN PATENT DOCUMENTS

| | | |
|---|---|---|
| 0286923 A2 | 10/1988 | European Pat. Off. . |
| 0420617 | 4/1991 | European Pat. Off. . |
| 0405159 | 1/1991 | Germany . |
| 4343254 | 6/1994 | Germany . |
| 6171366 | 6/1994 | Japan . |

*Primary Examiner*—Jerry Redman
*Assistant Examiner*—Curtis Cohen
*Attorney, Agent, or Firm*—Christie, Parker & Hale, LLP

[57] ABSTRACT

Twin-shell vehicle door with a double-strand cable window lift mechanism pre-fitted on a support plate, which is preferably to be inserted in connection with a modular constructed motor vehicle door, wherein the support plate sealingly covers a cut-out in the door inner panel. The lower free end of the guide rail on the B-column side does not project right into the fixing area (cover area) of the inner door panel and support plate whereas the lower free end of the guide rail on the A-column side projects into this fixing area or beyond same. The upper edge of the cut-out section in the inner door panel in relation to the extension of the breast runs downwardly inclined in the direction of the A-column at least at such an angle $\alpha$ that when the support plate swivels about an imaginary swivel point S about the angle $\alpha$ in the direction of the breast the lower free end of the guide rail on the A-column side is lifted over the fixing area.

16 Claims, 5 Drawing Sheets

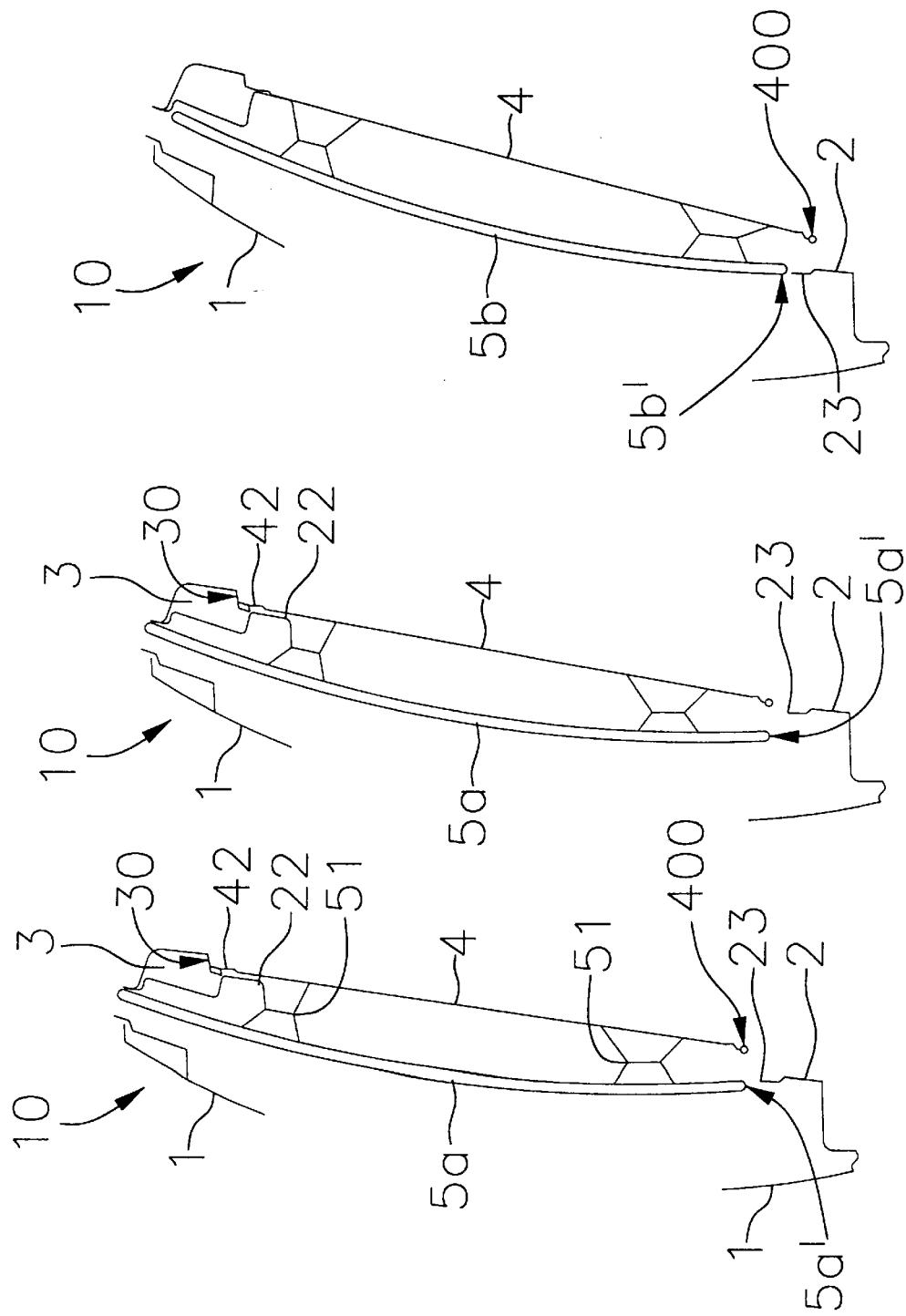

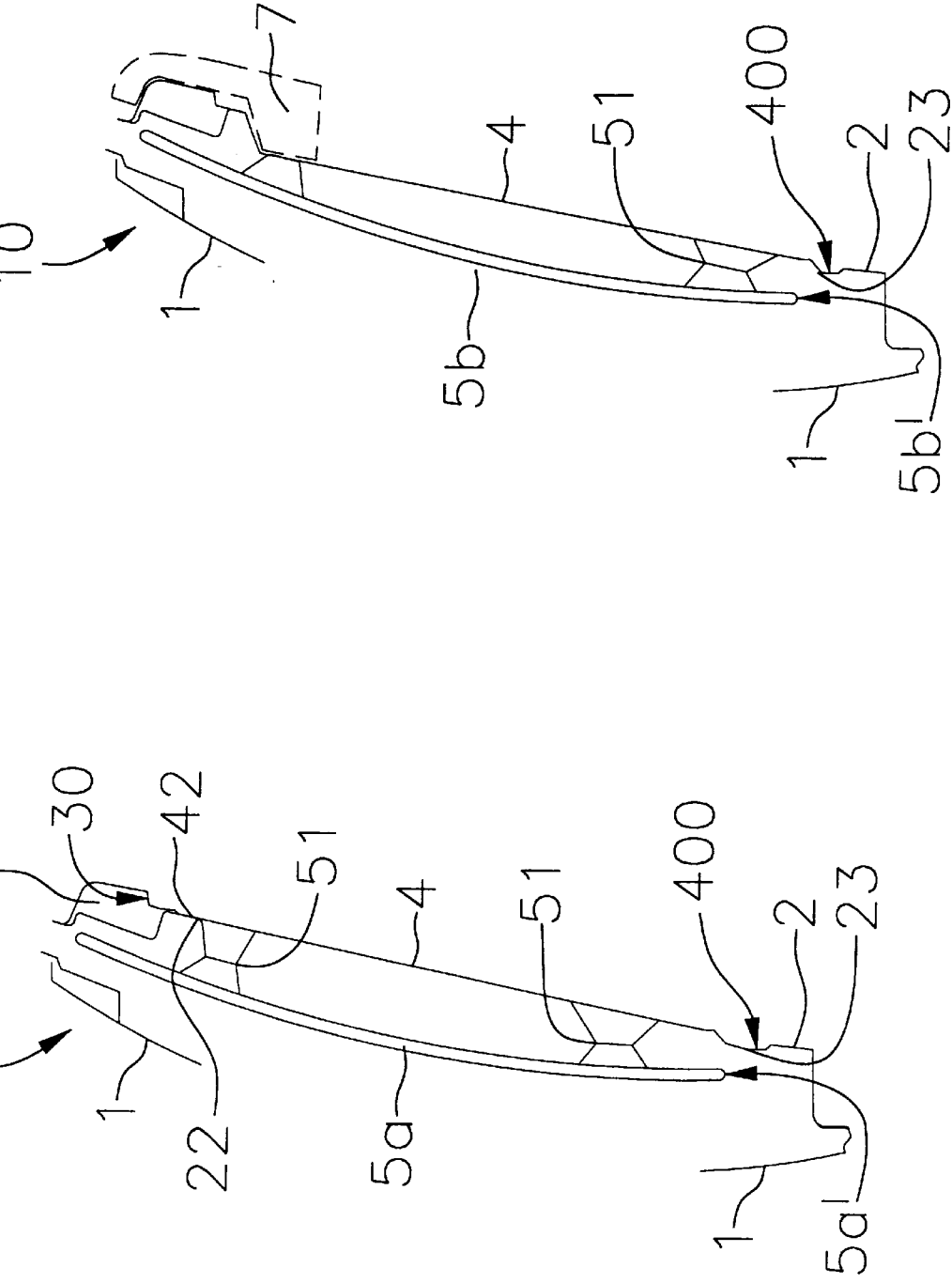

TWIN-SHELL VEHICLE DOOR WITH DOUBLE-STRAND CABLE WINDOW LIFT MECHANISM PRE-FITTED ON A SUPPORT PLATE

BACKGROUND OF THE INVENTION

The invention relates to a twin-shell vehicle door with a double-strand cable window lift mechanism pre-fitted on a support plate and to be used, with particular advantage, in conjunction with a modular vehicle door, wherein the support plate is adapted to sealingly cover a cut-out section in the inner door panel.

European Patent No. 0 420 617 B1 describes a door window insert for fitting into a vehicle door which consists of a frame with channel-like profiled sections extending down at the sides and a sealing assembly for enclosing the window pane. The insert consists of a plate supporting guide pulleys for a double-strand cable window lift mechanism which, with the window pane connected thereto, is inserted into these profiled sections.

The technical solution described does offer a unit which may be pre-checked during assembly, but also has the disadvantage that during its insertion through the gap in the door shaft, the very restricted spatial conditions make it impossible to pre-fit any component parts or structural groups which significantly increase the height of the insert. Thus, for example, a mechanical drive unit for the window lift mechanism and the door lock have to be fitted after installation of the insert.

When assembling a vehicle door built on the sandwich construction principle it is possible to pre-fit the drive unit and lock, but such doors have the disadvantage of only a very slight rigidity. Also, fitting the doors in the vehicle body can only be completed after lacquering. Often adjustment is only possible with expensive hinges.

The technical solution according to Japanese Patent A1 6-17 13 66 represents a vehicle door in sandwich construction. A support plate with guide elements for a window lift mechanism is mounted in a box-like inner door panel. A non self-supporting outer plastic door skin is connected along its edge to the inner door panel. The drawback here is that the door cannot be adjusted in the shell state.

A motor vehicle door with a large cut-out in the door inner panel is described in European Patent No. A2 0 286 923, and this cut-out is to be completely covered by the support plate of a module. The module carries a pre-mounted window pane which is guided in lateral guide rails and is connected to a window lifter. In the assembly of this module, the window pane is first maneuvered into the gap in the middle region of the door body so that the ends of the guide rails of the module form fittingly engage the guide rails of the door body. Finally the support plate is tilted into the door inner panel and screwed in place.

This solution has the disadvantage that the connection between the ends of the guide rails must be made when they are covered, which makes assembly difficult and expensive. Tolerances in the distances between the parallel guide rails can lead to undesirable mechanical stresses. Furthermore, this construction does not allow the use of window panes which are wider than the cut-out in the door inner panel.

SUMMARY OF THE INVENTION

According to one embodiment of the invention, a double-shell vehicle door is provided which includes a breast portion in a mid-section of the door, an inner door panel having a cut-out section with an upper edge which declines toward the A-column of the vehicle and a fixing area adjacent a bottom edge of the cut-out, a support plate which in a functioning position completely and sealingly covers the cut-out section provided in the inner door panel, and a double-strand cable window lift mechanism pre-fitted on the support plate and having an A-column guide rail and a B-column guide rail. A gap is provided in the mid-section of the door which is wide enough so that an upper end of the A-column guide rail can project therein. The support plate is arranged so that an upper free end of the A-column guide rail projects through the fixing area of the inner door panel, and a lower free end of the B-column guide rail does not project into the fixing area of the inner door panel. The upper edge of the cut-out section declines in relation to the of the breast at least at such an angle $\alpha$ such that when the support plate swivels about an imaginary swivel point about the angle $\alpha$ in the direction of the breast, a lower free end of the A-column guide rail is lifted over the fixing area of the inner door panel.

According to another embodiment of the invention, a vehicle door having a double-strand cable window lift mechanism which is pre-fitted on a support plate is provided. The use of the support plate ensures even in restricted spatial conditions, a large pane lift is possible without noticeably reducing the supporting face of support padding in the door. Furthermore, use of this support plate ensures a simple reliable assembly sequence. In the event that a prefitted lock is provided on the support plate, this lock is able to be placed without additional measures (e.g., displacement on a rail).

According to another embodiment, the lower free ends of the guide rails of the double-strand cable window lift mechanism lie on different planes so that their distance from the lower edge of the door differs. The lower free end of the guide rail on the B-column side (that is, the side towards mid-section of the vehicle) does not reach the fixing area between inner door panel and support plate, or at least does not project into the fixing area whereas the free end of the guide rail on the A-column side (that is, the side toward the front of the vehicle) lies in this fixing area or projects beyond it. The cut-out section in the inner door panel has an upper edge which declines in the direction of the A-column by an angle $\alpha$ relative to the breast of the vehicle door. This decline angle $\alpha$ should be large enough so that when the support plate swivels about an imaginary swivel point in the direction of the breast, the lower free end of the guide rail on the side of the A-column can be lifted over the fixing area.

The swivel point of the support plate lies between the guide rail on the B-column side and the B-column, preferably in the upper corner area of the support plate on the B-column side. Instead of the imaginary swivel point, it is also possible to use a definite swivel point. A screw or plug in the connecting point could fix a definite swivel point in the fixing area between the inner door panel and support plate.

The assembly of the support plate according to an embodiment of the invention is achieved by inserting the inclined upper edge of the inner door panel into an interspace between the support plate and the upper areas of the guide rails wherein the lower free end of the guide rail on the A-column side still lies outside of the door body. The support plate is then swivelled, preferably about a point in the area of its upper corner on the B-column side. The lower free end of the guide rail is then lifted away over the lower edge of the cut-out section in the inner door panel and the support plate up to the inner door pane in the lower area. The support plate is then swivelled in the opposite direction about the said swivel point in order to bring the fastening areas (cover areas) of the inner door panel and support plate into alignment. The lower free end of the guide rail on the A-column side thereby engages behind the lower edge of the cut-out section of the door. It is self-evident that the upper fixing point between the guide rail on the A-column side and the support plate must be set low enough so that the swivel angle can be achieved.

By selecting the swivel point in the area of the corner on the B-column side of the support panel, the swivel movement required for fitting the support plate requires only very slight relative movements between the inner door panel and the support plate in the area of the padding. Thus the padding rest need to be only negligibly reduced if at all.

The upper edge of the door cut-out inclined away from the direction of the A-column and inclined relative to the breast, as described, guarantees a complete covering of the door cut-out by the support plate despite the swivel fitting sequence. Thus, an embodiment of the invention ensures a hermetic separation of the wet and dry spaces in the door with simple technical means even in unfavorable spatial conditions.

Another embodiment of the invention can be used with particular advantage in conjunction with a vehicle door whose breast drops away backwards in the direction of the A-column. A lock can equally advantageously be pre-fitted on the support plate without having to provide expensive displacement mechanisms in order to bring the lock into its end position. Finally the swivel point provided in this area guarantees that the lock also carries out only slight movements during fitting of the support plate.

The comparatively large pane lift which can be achieved through another embodiment of the invention can be increased still further if the upper ends of the guide rails of the cable window lift mechanism are extended beyond the upper edge of the support plate.

DESCRIPTION OF THE DRAWINGS

The invention will now be explained in further detail with reference to the embodiment shown in the accompanying drawings, in which:

FIG. 3b is a cross-sectional view through the vehicle door according to FIG. 3a in the area of the guide rail on the A-column side at the end of a first assembly phase;

FIG. 3c is a cross-sectional view through the vehicle door according to FIG. 3a in the area of the guide rail on the A-column side at the end of a second assembly phase;

FIG. 3d is a cross-sectional view through the vehicle door according to FIG. 3a in the area of the guide rail on the B-column side at the end of a first assembly phase;

FIG. 4b is a cross-sectional view through the vehicle door according to FIG. 4a in the area of the guide rail on the A-column side; and FIG. 4c a cross-sectional view through the vehicle door according to FIG. 4a in the area of the guide rail on the B-column side.

DETAILED DESCRIPTION OF THE INVENTION

The Figures show in a general diagrammatic illustration the essence of the invention with reference to one embodiment. Details such as the cables or Bowden cable drive or other drive units not essential for understanding the invention have been omitted.

Figure 1:
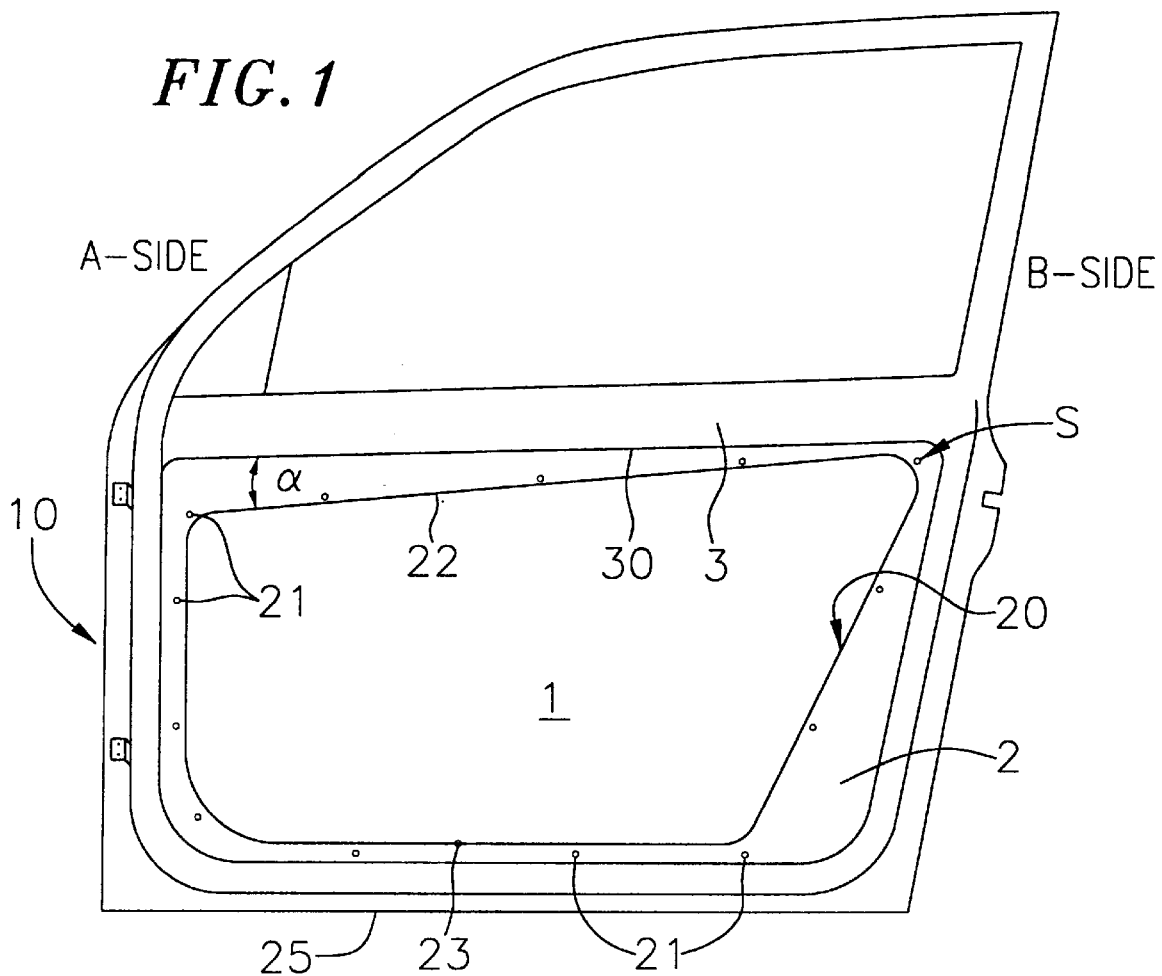
FIG. 1 is a side view of a vehicle door according to one embodiment of the invention with a large recess in the inner door panel.

FIG. 1 shows a vehicle door 10 comprising an outer door panel 1 and an inner door panel 2 wherein this inner panel 2 has a large cut-out section 20. A lower edge 23 of the cut-out section 20 is substantially parallel to a lower edge 25 of the door. An upper edge 22 of the cut-out section 20 runs at an angle α relative to a projection 30 of a breast 3 of the door whereby the edge 22 declines in the direction of an A-column of the vehicle (that is, the column at the front of the vehicle). Spaced fixing points 21 are arranged along the perimeter of the cut-out section 20. A fixing point lying in the right upper corner area is provided at a swivel point S required for assembly according to an embodiment of the invention. The swivel point S need not necessarily be a fixed point as shown in this embodiment but can also be an imaginary swivel point for free-handed swivelling of a un-fixed support plate 4 (FIG. 2).

Figure 2:
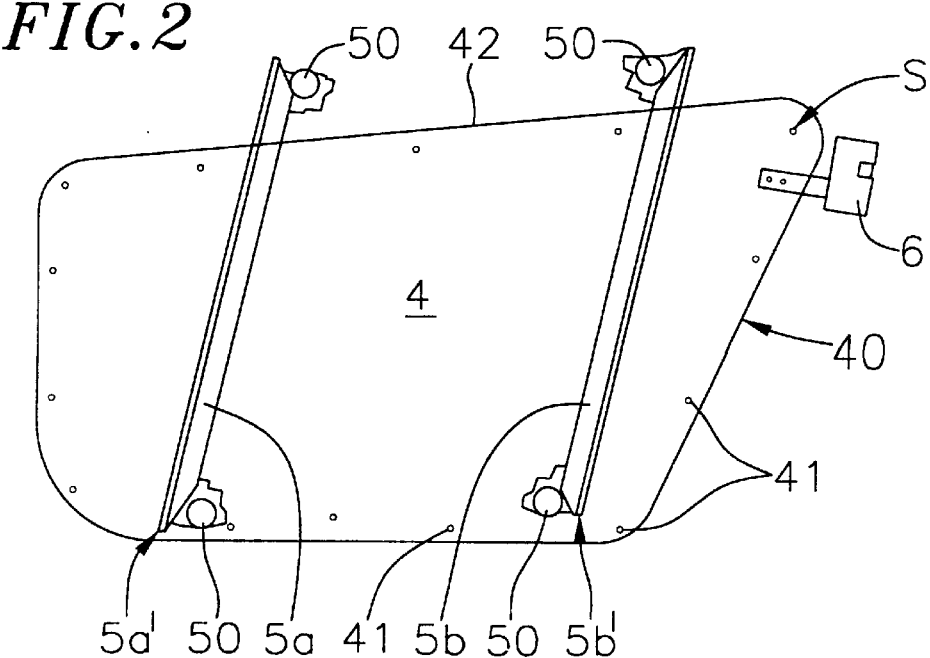
FIG. 2 is a side view of a support plate with a pre-fitted double-strand cable window lift mechanism and a lock.

FIG. 2 shows support plate 4 which approximates the shape and size of the cut-out section 20 in the door. It is dimensioned to cover the cut-out section 20 completely. A seal 400 is provided along the edge area to ensure a good seal between the inner space of the door (the so-called dry space) and the outer space of the door (the so-called wet space). Two guide rails 5a, 5b of a double-strand cable window lift mechanism are pre-fitted on the support plate 4. Preferably, their upper free ends project substantially over an upper edge 42 of the support plate 4. At their ends, the guide rails 5a, 5b support rollers 50 over which the cable is guided. The free lower end 5a' of the guide rail 5a on the A-column side projects into a fixing area adjacent fixing points 41. On the other hand, the lower free end 5b' of the guide rail 5b a positioned above the fixing area to simplify assembly in this area. In an alternate embodiment, a lock unit 6 has already been pre-fitted in the upper right corner area of the support plate 4 in addition to the window lift mechanism.

Figure 3A:
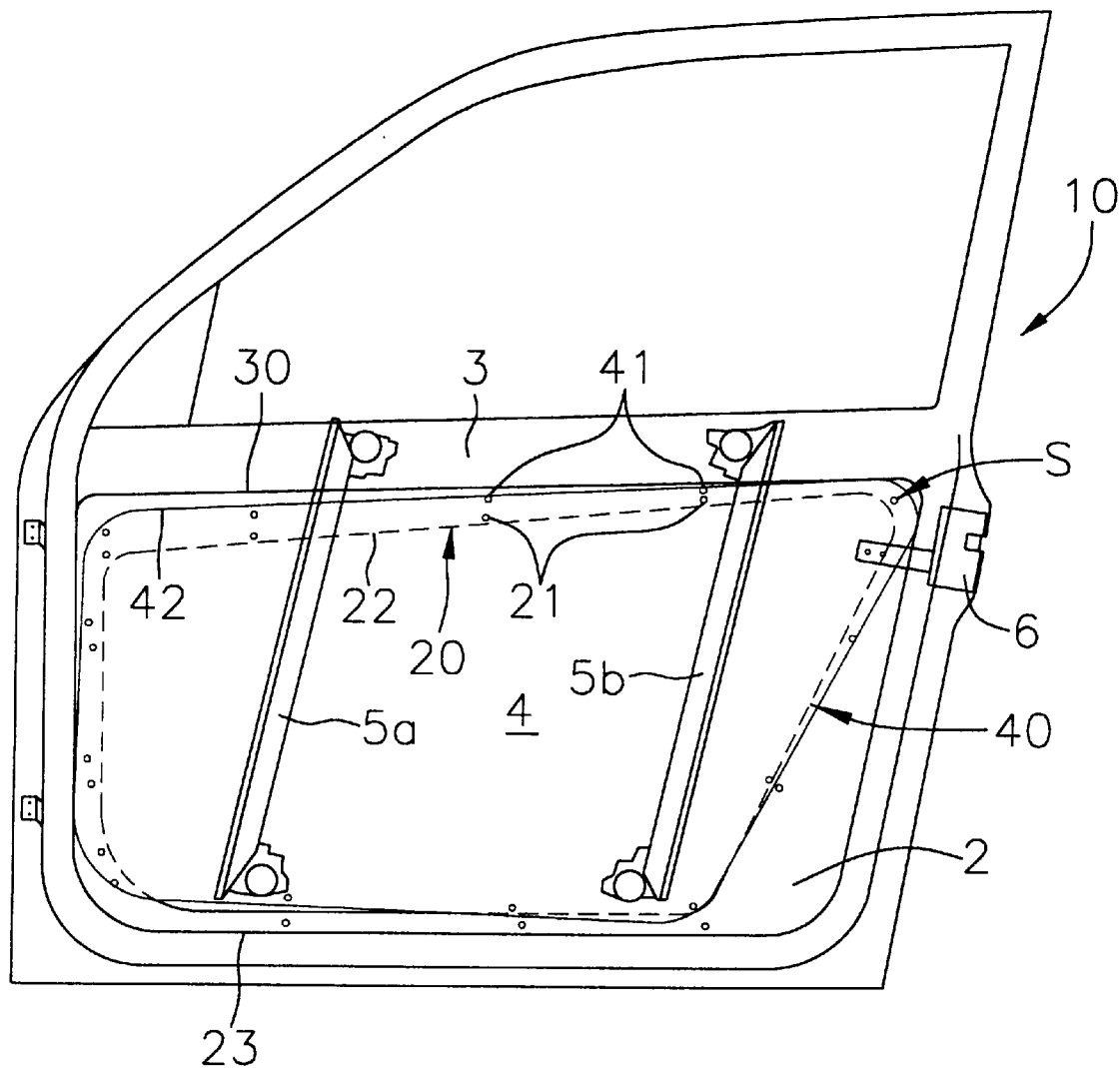
FIG. 3a is a side view of the vehicle door during assembly of the support plate wherein the guide rail of the window lift mechanism on the A-column side is swivelled upwards into the breast area.

FIGS. 3a–3d show the various phases of assembly of the modular vehicle door designed according to an embodiment of the invention. FIG. 3a shows a side view of the vehicle door during the fitting of the support plate 4. The support plate 4 is shown roughly in its uppermost position wherein its upper edge 42 adjoins the projection 30 of the door breast 3 and runs more or less parallel thereto. In this position the free lower end 5a' of the guide rail 5a is located above the lower edge 23 of the cut-out section 20 of the door so that the support plate 4 can be lifted up against the inner door panel 2.

FIG. 3b shows the cross-section through the vehicle door in the area of the guide rail 5a on the A-column side after the guide rail 5a had been pushed deep into the gap in the inside of the breast 3. When dimensioning the vehicle, it should be observed that, in dependence on the required assembly lift of the support plate 4 in this area, the arrangement of an upper fixing web 51 between the guide rail 5a and support plate 4 is selected at such a height such that fixing web 51 does not collide with the lower edge 22 of the cut-out section 20 in the inner door panel before the necessary assembly lift is achieved. The same applies also for the upper edge 42 of the support plate 4 and the projection 30 of the breast 3.

FIG. 3c shows the second phase of the assembly process wherein the lower area of the support plate 4 is lifted in the direction of the inner door panel 2 and thus the free lower end 5a' of the guide rail 5a comes to lie inside the door body.

From FIG. 3d, it can be seen that the support plate 4 in the area of the guide rail 5b on the side of the B-column has practically reached its ideal position even after the first assembly phase. Since vertical displacements in this area are minimal, the fixing area can lie in the vicinity of the projection 30 of the breast 3.

Figure 4A:
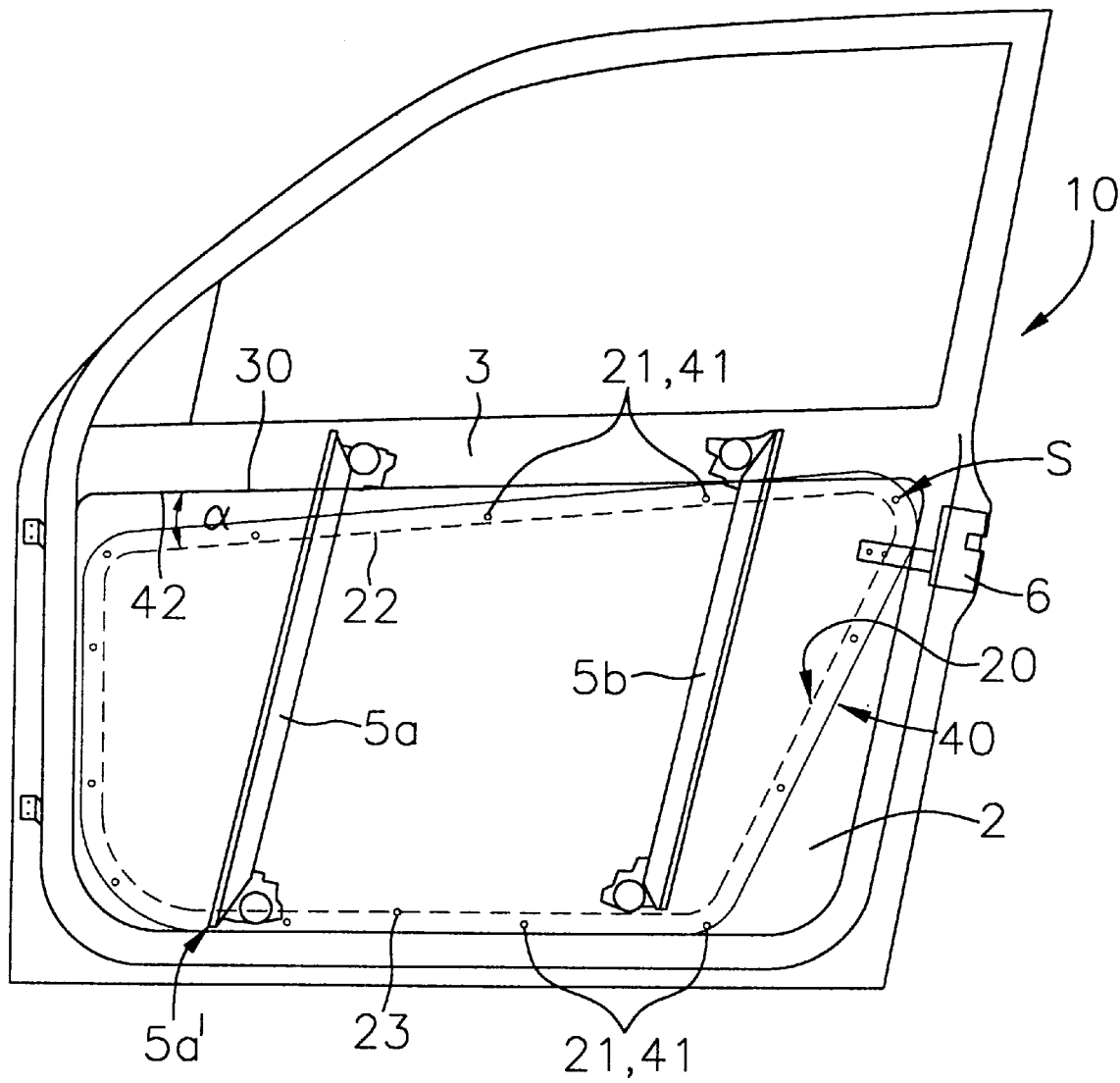
FIG. 4a is a side view of the vehicle door with a support plate located in its functioning position.

FIG. 4a shows a side view of the vehicle door in which the support plate 4 has already occupied a functional position in which the fixing areas 21, 41 of the inner door panel 2 and of the support plate 4 coincide. This functioning position was reached starting from the assembly position shown in FIG. 3*a* by swivelling the support plate 4 about the swivel point S. The lower free end 5*a*' of the guide rail 5*a* thereby projects into the lower fixing area with the fixing points 21,41.

Particularly when using a lock 6 fixedly mounted on a support plate 4, the assembly swivel point S should lie as near as possible with the lock 6 so that the lock in the door body need only carry out the smallest possible relative movements during the assembly process.

FIG. 4*b* shows a cross-section through the vehicle door near the guide rail 5*a*. It clearly shows the substantially greater distance of the upper edge 42 of the support plate 4 from the projection 30 of the breast 3 in the end position, compared with FIG. 4*c* (sectional illustration in the area of the guide rail 5*b* on the B-column side). This substantially greater distance which is required for carrying out the swivel assembly movement must be taken into account when shaping the inner door lining. Where a padding 7 has been pre-fitted on the support plate 4, no or only very slight restrictions can exist on the side facing the B-column for the reasons already cited.

What is claimed is:

1. A double-shell vehicle door comprising:

a breast;

an inner door panel;

a support plate; and a double-strand cable window lift mechanism fitted on the support plate wherein the support plate substantially, completely and sealingly covers a cut-out section provided in the inner door panel, wherein in the inside of the door there is a gap which is wide enough so that an upper end of the cable window lift mechanism can project therein when mounted on an A-column side of a vehicle, and wherein a lower free end of a first guide rail in the window lift mechanism to be mounted on the A-column side of the vehicle projects through a fixing area formed by a covering area of the inner door panel and the support plate, wherein a lower free and of a second guide rail in the window lift mechanism to be mounted on a B-column side of the vehicle does not project into the fixing area of the inner door panel and the support plate, and wherein an upper edge of the cut-out section in the inner door panel in relation to the extension of the breast runs downwardly thereby declining in the direction toward the first guide rail from the second guide rail at least at such an angle that when the support plate swivels about an imaginary swivel point about the angle in the direction of the breast, the lower free end of the first guide rail is lifted over the fixing area of the inner door panel.

2. The vehicle door according to claim 1 wherein the swivel point lies on a side of the second guide rail opposite the first guide rail.

3. The vehicle door according to claim 2 wherein the swivel point lies in an upper corner area of the support plate on a second guide rail side of the door.

4. The vehicle door according to claim 1 wherein the swivel point coincides with a fixing point in the fixing area between the inner door panel and the support plate.

5. The vehicle door according to claim 1 wherein the support plate includes a fitted lock.

6. The vehicle door according to claim 1 wherein the breast of the door drops down in a travel direction.

7. The vehicle door according to claim 1 wherein the upper free ends of the guide rails project beyond an upper edge of the support plate.

8. A double-shell vehicle door for use in a vehicle having an A-column and a B-column, comprising:

a breast portion in a mid-section of the door;

an inner door panel having a cut-out section with an upper edge and a fixing area adjacent a bottom edge of the cut-out;

a support plate which in a functioning position completely and sealingly covers the cut-out section provided in the inner door panel;

a double-strand cable window lift mechanism fitted on the support plate and having an A-column guide rail and a B-column guide rail; and a gap in the mid-section of the door wide enough so that an upper end of the A-column guide rail can project therein, wherein a lower free end of the A-column guide rail projects through the fixing area of the inner door panel, wherein a lower free end of the B-column guide rail does not project into the fixing area of the inner door panel, and wherein the upper edge of the cut-out section declines in the direction toward the A-column guide rail from the B-column guide rail and declines in relation to that of the breast portion at least at such angle such that when, during assembly, the support plate swivels about an imaginary swivel point about the angle in the direction of the breast, the lower free end of the A-column guide rail is lifted over the fixing area of the inner door panel.

9. The vehicle door of claim 8 wherein the support plate has a fixing area which is adjacent the inner door fixing area in the functioning position, and wherein the lower end of the A-column guide rail projects into the fixing area of the support plate and the B-column guide rail does not project into the fixing area of the support plate.

10. The vehicle door according to claim 8 wherein the swivel point lies a side of on the B-column guide rail opposite the A-column guide rail.

11. The vehicle door according to claim 10 wherein the swivel point lies in a upper corner area of the support plate on the B-column guide rail side of the door.

12. The vehicle door according to claim 8 wherein the swivel point coincides with a fixing point in the fixing area between the inner door panel and the support plate.

13. The vehicle door according to claim 8 wherein the support plate includes a fitted lock.

14. The vehicle door according to claim 8 wherein the breast of the door drops down in a travel direction.

15. The vehicle door according to claim 8 wherein the upper free ends of the guide rails project beyond an upper edge of the plate.

16. The vehicle door according to claim 8 wherein when the support plate swivels about the imaginary swivel point about the angle in the direction of the breast, the lower free end of the A-column guide rail is lifted over the fixing area and the bottom edge of the cut-out portion of the inner door panel.

* * * * *